(12) United States Patent
Tsai

(10) Patent No.: US 7,182,180 B2
(45) Date of Patent: Feb. 27, 2007

(54) BIKE BRAKE CLAMP

(75) Inventor: Szu-Fang Tsai, Hua Hsien (TW)

(73) Assignee: Tektro Technology Corporation, Changhua Hsien (TW)

( * ) Notice: Subject to any disclaimer, the term of this patent is extended or adjusted under 35 U.S.C. 154(b) by 15 days.

(21) Appl. No.: 10/996,392

(22) Filed: Nov. 26, 2004

(65) Prior Publication Data
US 2006/0113151 A1 Jun. 1, 2006

(51) Int. Cl.
B62L 1/06 (2006.01)
B62L 1/02 (2006.01)
(52) U.S. Cl. ............ 188/24.12; 188/28; 188/2 D
(58) Field of Classification Search ........ 188/2 D, 188/24.11, 24.12, 24.13, 24.14, 24.15, 24.16, 188/24.21, 24.22, 28
See application file for complete search history.

(56) References Cited

U.S. PATENT DOCUMENTS 4,014,408 A * 3/1977 Armstrong ........... 188/24.15
5,425,434 A * 6/1995 Romano ............... 188/24.15
6,776,267 B2 * 8/2004 Tsai .................... 188/24.12

FOREIGN PATENT DOCUMENTS

AT 234532 * 7/1964 ........... 188/24.12

* cited by examiner

Primary Examiner—Thomas Williams
(74) Attorney, Agent, or Firm—Leong C. Lei

(57) ABSTRACT

A bike brake clamp to provide safe and effective braking including a first brake arm, a second brake arm, a joint plate, and a pilot plate adapted with spring, central screw, cable screw, and pivot screw; both brake arms providing synchronous clamping via the pilot plate to correct the application of brake force on single side of the rim; a moment (longer than that of the prior art) between an adjustment screw at the point where brake force is applied and the central screw at the support being used to achieve better mechanical benefits.

1 Claim, 6 Drawing Sheets

BIKE BRAKE CLAMP

BACKGROUND OF THE INVENTION (a) Technical Field of the Invention

The present invention is related to a bike brake clamp, and more particularly, to an assembly of a first brake arm, a second brake arm, a joint plate, and a pilot plate all sheet metal molded by press.

(b) Description of the Prior Art

Referring to FIG. 6 of the accompanying drawings, a bike brake clamp generally available in the market includes a first brake arm 11 and a second brake arm 12 made of metal molded by press adapted with a return spring 13, a central screw 14, and an adjustment screw 15. Both brake arms 11, 12 are pivoted to each other with the central screw 14 penetrating through both brake arms 11, 12. After a certain time of use, both brake arms 11, 12 are not necessarily subject to the same extent of force applied resulting in poor braking results. Many countries are now practicing stricter requirements of the braking effects and tests.

SUMMARY OF THE INVENTION

The primary purpose of the present invention is to provide a bike brake clamp that eliminates the situation of having only one side of the rim is subject to the braking force applied and secures a safer and more efficient braking. To achieve the purpose, the present invention is essentially comprised of as assembly of a first brake arm, a second brake arm, a joint plate, and a pilot plate all metal sheet molded by press adapted with volute spring, central screw, cable screw and pivot screw; both brake arms synchronously execute the braking; and a moment (longer than that of the prior art) is between an adjustment screw disposed at where the braking force is applied and the pivot screw at a support achieves better mechanical benefits.

Another purpose of the present invention is to provide a bike brake clamp. Wherein, the volute spring is inserted to the outer layer of a spring bush of the central screw; the straight end of the volute spring holds against the retaining edge of the first brake arm to directly check the first brake arm; and the curved end of the volute spring is inserted into a hole provided on the joint plate to indirectly check the second brake arm. Accordingly, the volute coil provides effective return for both of the first and the second brake arms.

The foregoing object and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

Figure 1:
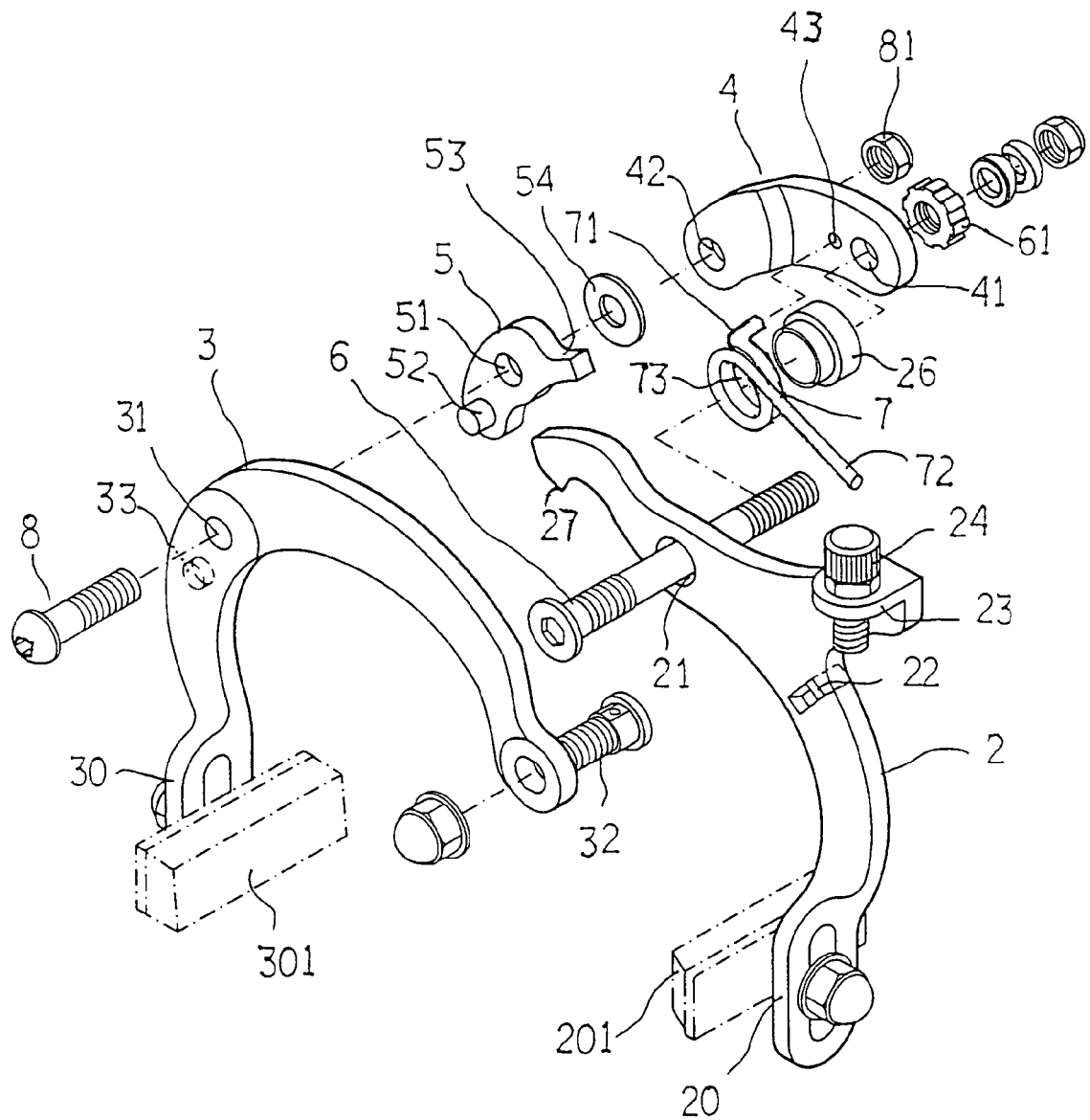
FIG. 1 is a perspective view of the present invention.
Figure 2:
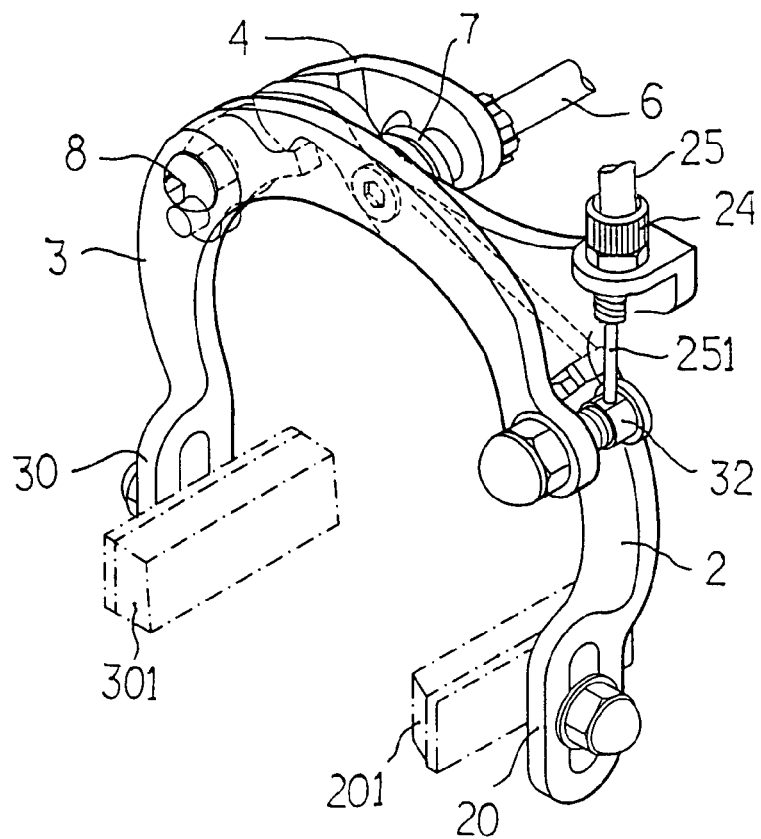
FIG. 2 is a schematic view showing the present invention as assembled.
Figure 3:
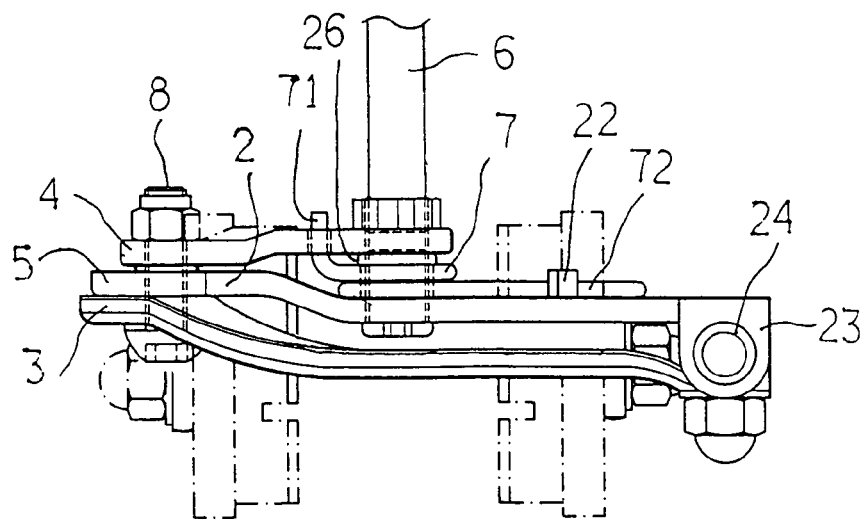
FIG. 3 is an upward view of the present invention.
Figure 4:
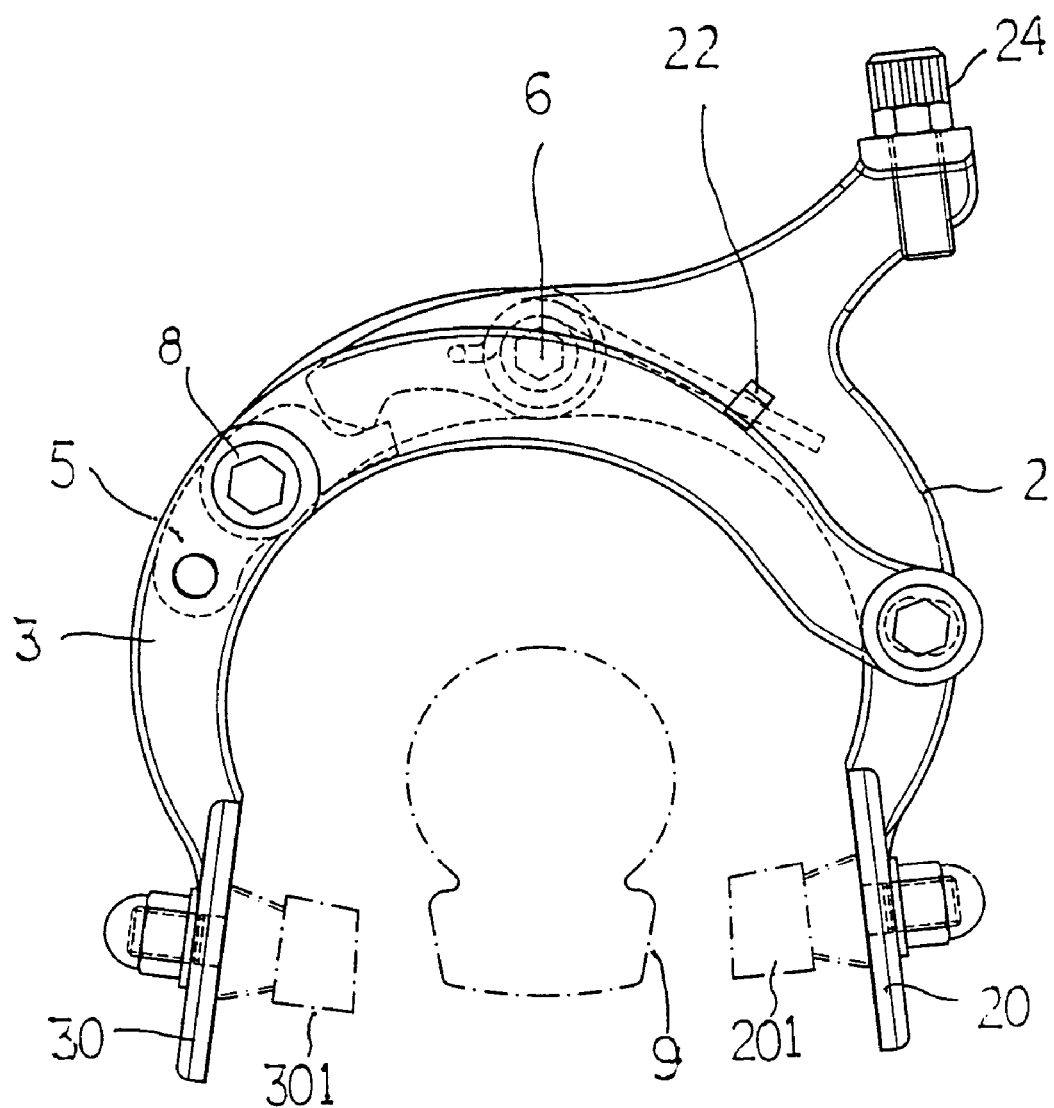
FIG. 4 is a schematic view showing a layout of the present invention (1).

The following descriptions are of exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Referring to the FIGS. 1, 2, 3, 4 and 5, a preferred embodiment of the present invention is essentially comprised of a first brake arm 2, a second brake arm 3, a joint plate 4, and a guide plate 5 all made of sheet metal molded by compress. Wherein, a central screw 6 penetrates a locking hole 21 provided on one side of the first brake arm 2, a space 73 of a volute spring 7, a spring bush 26, an insertion hole 41 of the joint plate 4, and a fork of the bike and is locked in position by a retaining nut 61. A pivot screw 8 penetrates in sequence a through hole 31 of the second brake arm 3, an axial hole 51 in the guide plate 5, a through hole 42 provided on the other side of the joint plate 4, and fastened in position with a nylon nut 81. A friction pad 54 is provided between the joint plate 4 and the guide plate 5. A curved end 71 of a volute spring 7 is inserted into a hole 43 of the joint plate 4, while the other end 72 of the volute spring 7 holds against a retaining edge 22 of the first brake arm 2, and the curved end 71 connects a brake cable 25 by means of an adjustment screw 24 locked to a head end 23 of the first brake arm 2. Meanwhile, the terminal 251 of the brake cable 25 is fixed to a locking screw 32 disposed at one end of the second brake arm 3. Accordingly, when a braking is executed, both braking ends 20, 30 respectively of the first and the second brake arms 2, 3 for driving both brake pads 201, 301 locked respectively to the distal ends of both brake arms 2, 3 to clamp the rim 9 to stop the wheel of the bike. Once the force applied to stop the bike is released, the volute coil 7 returns both of the first and the second brake arms to their original positions.

While being held against by the curved end of the volute coil 7, the joint plate 4 properly checks the guide plate 5. A post 52 extending from the guide plate 5 is inserted into a locking channel 33 of the second brake arm 3 while the concave part 53 of the guide plate 5 is held against by a protruded end 27 from the first brake arm 2 so to facilitate the passive interaction between both of the first and the second brake arms 2, 3 to synchronously execute the clamping without the situation of being subject to the externally applied braking force on one side of the rim only.

All key members as well their components, e.g., the post 52 of the guide plate 5, the channel 33 in the second brake arm 3, and the retaining edge 22 of the first brake arm 2, are all made of metal materials molded and integrated by press to meeting economic benefits by providing better structural strength and easier assembly.

Figure 5:
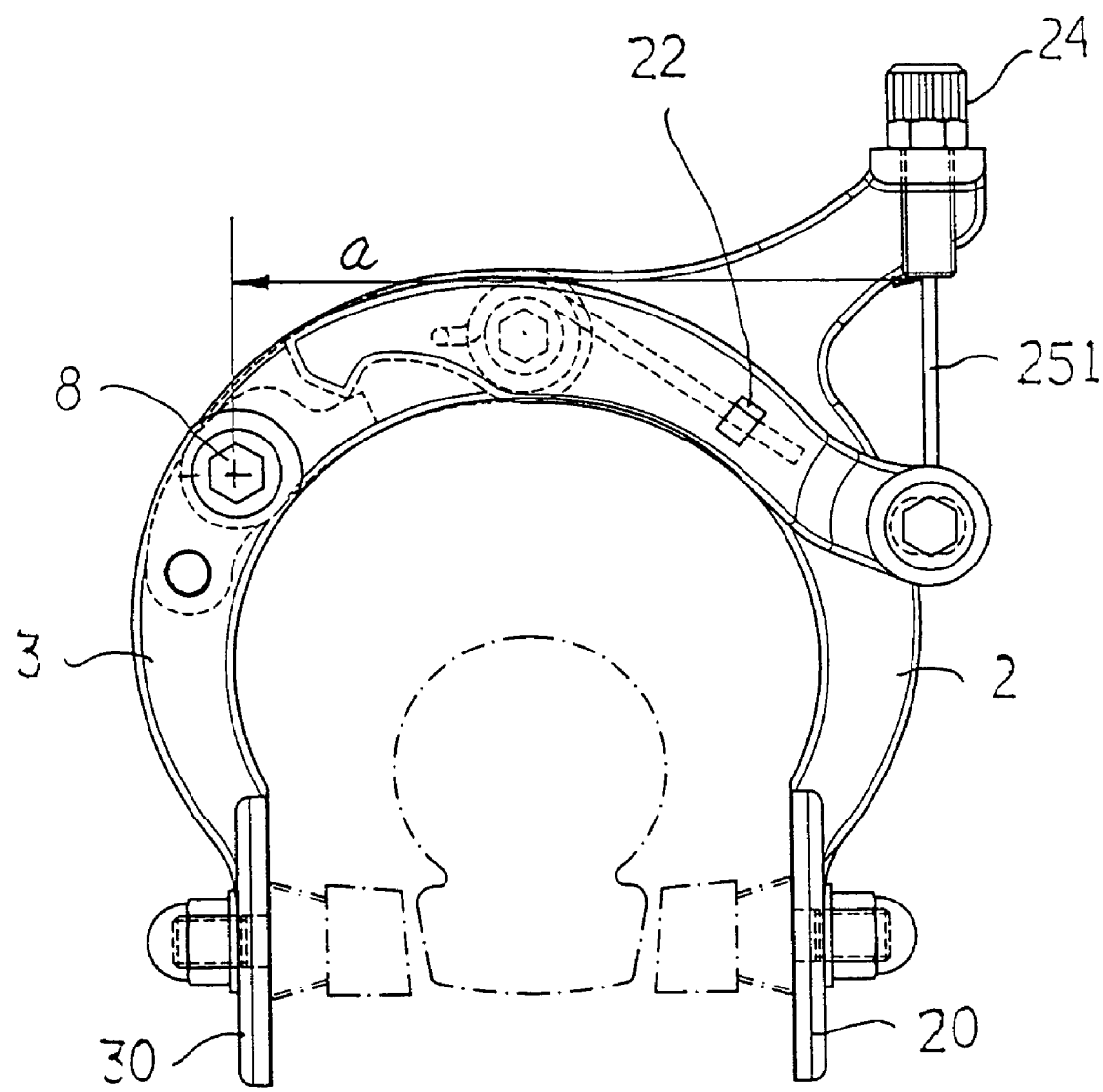
FIG. 5 is a schematic view showing a layout of the present invention (2).
Figure 6:
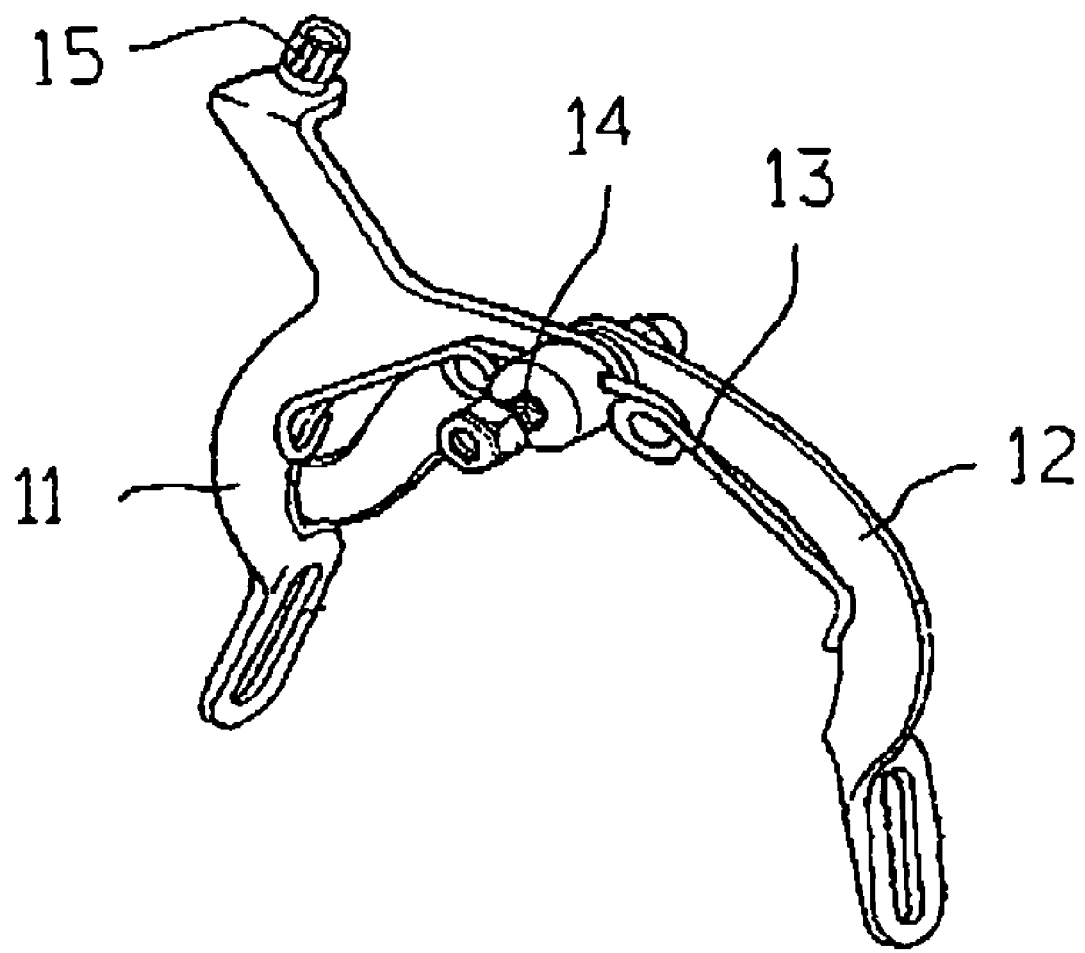
FIG. 6 is a perspective view of a prior art bike brake clamp.
Figure 7:
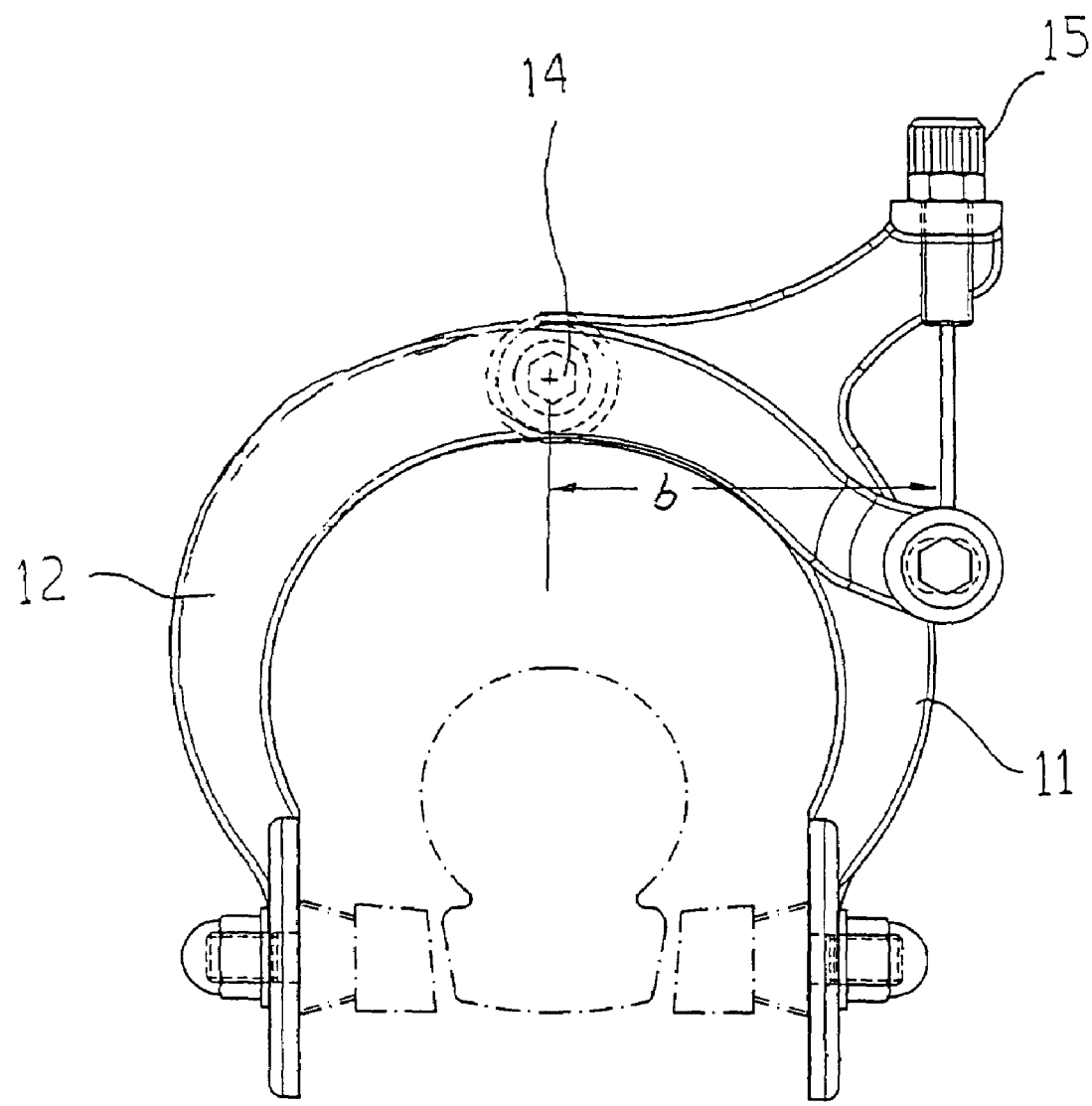
FIG. 7 is a schematic view showing the operation of the prior art.

As illustrated in FIG. 5, a moment a between the adjustment screw 24 disposed at the point where the braking force is applied and the pivot screw 8 disposed at the support of the present invention is longer than the moment b between an adjustment screw 15 disposed at where the braking force is applied and a central screw disposed at the support in the prior art as illustrated in FIG. 7 thereby allowing the present invention to achieve better mechanical benefits thus to provide safer and more efficient execution of a brake.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. A bike brake clamp includes a first brake arm, a second brake arm, a joint plate, and a pilot plate all made of metal materials molded by press; a central screw respectively passing through a locking hole provided on one side of the first brake arm, a spring bush, an insertion hole in the joint plate, and locked in position by a retaining nut; a pivot screw in sequence passing through a hole on the second brake arm, an axial hole on the pilot plate, a through hole on the other side of the joint plate and locked by another nut; a volute coil being provided to the spring bush provided at the outer layer of the central screw; a curved end of the volute coil being inserted into a hole of the joint plate, a second end of the volute coil holding against a retaining edge of the first brake arm, the joint plate being held by the curved end of the volute spring and properly limiting the pilot plate; a post extending from one end of the pilot plate holding against and movably pivoted into a locking channel in the second brake arm to facilitate interaction between the first and the second brake arms to synchronously execute the clamp; both compression ends of the first and the second brake arms being linked to permit both brake pads respectively disposed at the distal ends of the first and the second brake arms to clamp a rim of a wheel of the bike to execute the braking; when the force applied to brake being released, the volute coil returning both of the first and the second brake arms to their original positions.

* * * * *